UNITED STATES PATENT OFFICE.

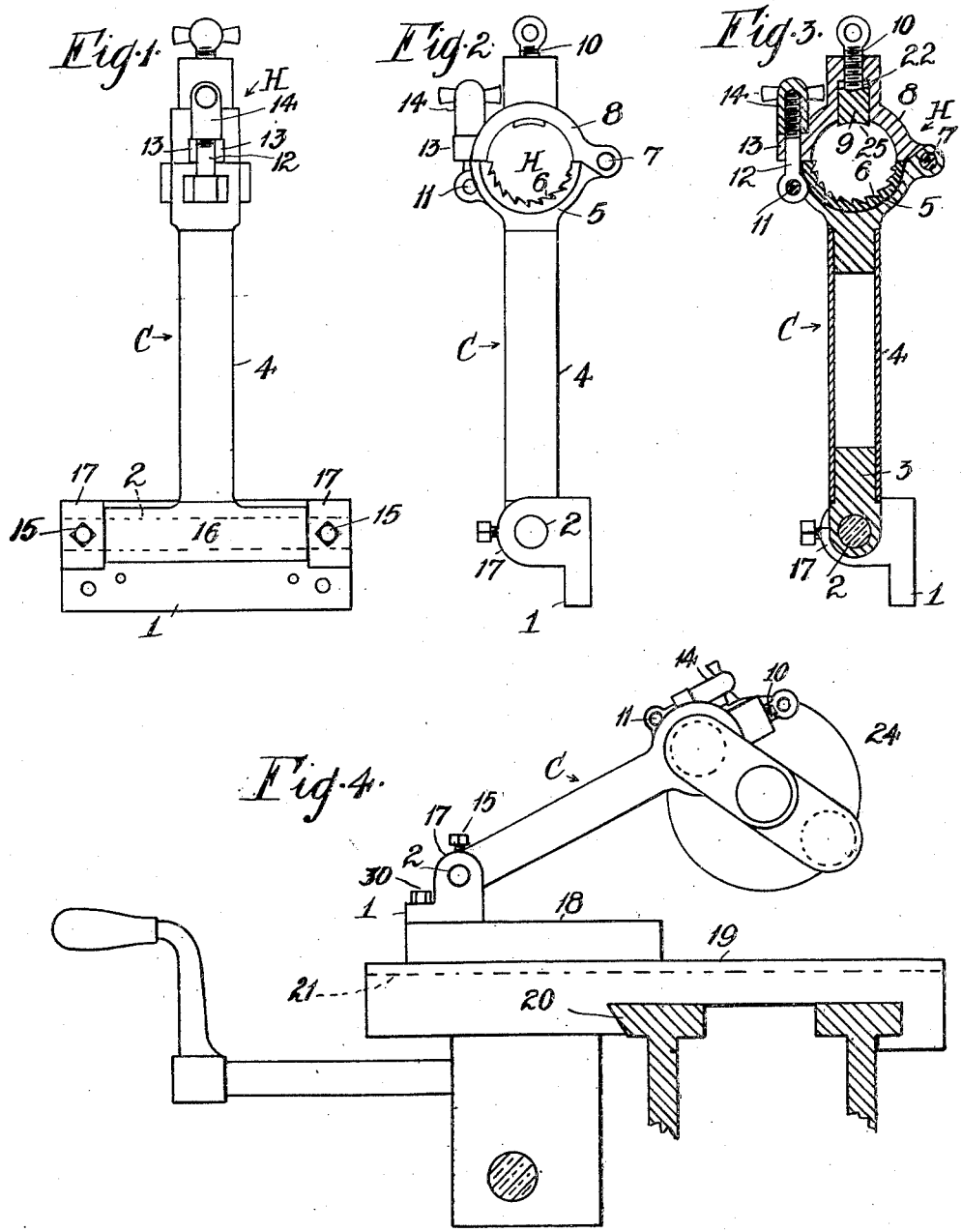

THOMAS SMITH, OF WARRNAMBOOL, VICTORIA, AUSTRALIA.

MEANS FOR TURNING CRANK-PINS AND ECCENTRICS AND TRUING CRANK-SHAFTS.

1,346,271.   Specification of Letters Patent.   Patented July 13, 1920.

Application filed May 29, 1918. Serial No. 237,247.

*To all whom it may concern:*

Be it known that I, THOMAS SMITH, subject of the King of Great Britain, residing at Fairy Street, Warrnambool, in the State of Victoria, Commonwealth of Australia, have invented certain new and useful Improvements in Improved Means for Turning Crank-Pins and Eccentrics and Truing Crank-Shafts, of which the following is a specification.

As is well known the operation of turning crank pins of crank shafts and eccentrics and of truing crank shafts has always been found difficult on account of the distance of the operating end of the tool from its supporting end and the difficulty experienced in chucking and retaining the crank shaft in true position during the turning operations.

In some cases the crank pins are chucked in axial alinement with the lathe center with the crank bearings offset to the amount of the crank's throw with the result that it is impossible to use the ordinary speeds and feeds as the tool would dig into the crank pin to such an extent as to throw said pin out of center and produce grooves in the work.

These disabilities have been lessened to some extent by the addition of an adjustable eccentric fitted on the crank shaft and journaled in a support.

This invention has been devised to cut true cylindrical surfaces on eccentrics and crank pins of crank shafts and during the cutting of the latter to assure the truth of the shaft.

According to this invention means for the purpose stated consists of a cutting tool having its operating surface contoured to agree with the cylindrical surface to be produced, the tool being contained in a holder attached to a crank arm. The latter is so disposed as to maintain the tool in true position with the axial center of the eccentric or the crank pin being cut out.

In effecting the cutting of a crank pin, the shaft carrying the pin has its bearing ends held centered between a rotating element and its co-acting dead center the axial center of which element is in exact parallel with the center of the crank pin.

It will be evident that in truing a plurality of pins on a crank shaft each pin can be cut by this tool with the assurance that the axes of all the pins will be in alinement.

A practical form of the invention is illustrated in the drawings of which—

Figure 1 is a plan;

Fig. 2 is a side elevation; and

Fig. 3 a longitudinal section of the cutting tool;

Fig. 4 is a transverse section illustrating the tool in use in a lathe with a crank pin in position for cutting.

The shank 4 of the crank arm C carrying the cutting tool as illustrated consists of a steel tube in one end of which is brazed a T-shaped steel forging 3 the transverse head 16 of which is free to rock on a pivotal steel pin 2 arranged parallel with the axis of the crank shaft and fitted at its ends in lugs 17 formed on a base 1, said pin being fixed by screws 15.

The base 1 is secured by bolts 30 to a tool support 18 which reciprocates transversely in guides 21 on a slide 19 movable parallel with the crank shaft center on the machine base 20.

The other end of the shank is fitted with a two piece cutter holder H one part consisting of a seating 5 having a semi-cylindrical interior and containing a spirally toothed or other suitable cutter 6 having a concaved operative surface.

The cutter is held in place by means of the other part of the holder consisting of a cover 8 hinged on a pin 7 and overlying said cutter.

The cover is fixed by means of a screw threaded stud 12 pivoted on a pin 11 on the holder and adapted to swing into a slot formed by lugs 13, 13 on the cover and secured by a capstan-headed nut 14 bearing upon said lugs.

The cover is provided opposite the cutter with a housing recess 22 open at the inner end in which is slidably seated a bearing block of brass 9 formed with a concave inner end or face 25 said block being fed inwardly to bear upon the surface being machined in order to keep the cutter to its work. This block 9 is adjustable by means of a screw 10 screwed through the cover 8 and bearing upon said block.

Applied to an ordinary lathe the slide and screws would be removed from the cross slide which may then reciprocate freely at right angles to the lathe center.

In setting up the tool, a mandrel of the same diameter as the element to be machined is fixed in the lathe with the holder containing the cutting tool embracing said mandrel and the screw 10 of the adjustable block 9 tightened to bring the cutting surface of the tool 6 into working position. The base of the crank arm C is then secured by the bolts 30 to the slidable support when the tool is set in true position.

The mandrel is then removed and the end bearings of the crank shaft centered between the chuck 24 and the usual dead center at the other end and the first element to be cut held in the tool head. The lathe is then started at slow speed and the screw 10 adjusted as required.

The result is that during one cycle or complete revolution of the crank shaft the whole peripheral surface of the crank is caused to contact with the teeth of the cutter.

When one crank pin is machined sufficiently the tool is disconnected therefrom and the slide 19 moved along the machine bench till the tool is opposite the next pin to be cut.

It will be evident that once the tool is set in true position and fixed with set screws or bolts and steady pins it can be refitted to the lathe at any time without the use of a mandrel.

It will be understood that the cutter and coöperating bearing block of each tool holder will vary according to the diameter required for the pin, bearing or eccentric.

According to the construction described the cutting tool returns the sliding tool support 18 but if desired this might be accomplished by means of a weight and cable, while furthermore, the tool can be balanced by means of a tail weight.

I claim:—

1. A machine for truing up or turning crank pins of crank shafts and eccentrics, having in combination a rotary element and a dead center between which the work is held in axial alinement, a support, a crank arm pivotally connected at one end to said support whereby the crank arm is permitted to rock in a plane at right angles to the axis of the crank shaft, and a tool holder carried on the other end of said crank arm, said holder comprising two semi-cylindrical members hinged together, one of said members having its inner periphery formed as a semi-cylindrical cutter and the other member having a non-cutting inner face, the cutting face of said cutting member having a contour corresponding with a semi-contour of the true form intended for the finished work, means for maintaining the cover closed, said cover being formed with a recess which extends in a radially outward direction from the inner periphery of the cover, and having a screw hole which extends from said recess through the outer periphery of the cover, a block located in said recess and radially slidable therein, its inner end being radially slidable therein, its inner end being concave and adapted to engage the work in the holder, and a screw which is adjustable in said screw hole and is capable of being set up to engage with said block to hold the block in a position to maintain the work in operative relation to the cutter.

2. A machine for truing up or turning crank pins of crank shafts and eccentrics, having in combination a crank arm pivotally connected at one end, whereby the crank arm is permitted to rock in a plane at right angles to the axis of the crank shaft, and a tool holder carried on the other end of said crank arm, said holder comprising two semi-cylindrical members hinged together, one of said members having its inner periphery formed as a semi-cylindrical cutter and the other member having a non-cutting inner face, the cutting face of said cutting member having a contour corresponding with a semi-contour of the true form intended for the finished work, means for maintaining the cover closed, said cover being formed with a recess which extends in a radially outward direction from the inner periphery of the cover, and having a screw hole which extends from said recess through the outer periphery of the cover, a block located in said recess and radially slidable therein, its inner end being adapted to engage the work in the holder, and a screw which is adjustable in said screw hole and is capable of being set up to engage with said block to hold the block in a position to maintain the work in operative relation to the cutter.

3. A machine for truing up or turning crank shafts and crank pins of crank shafts and eccentrics, having in combination a rotary element and a dead center between which the work is held in axial alinement, a reciprocable work support, a crank arm pivotally connected at one end to said support whereby the crank arm is permitted a rocking movement in a plane at right angles to the axis of the crank shaft, a tool holder carried on the other end of said crank arm, said holder comprising a semi-cylindrical seat for a cutting tool, a semi-cylindrical cutter fitted therein, and a semi-cylindrical cover hinged to said seat, said cutter and cover when closed forming a cylindrical work holder, the cutting face of said cutter having a contour corresponding with a semi-contour of the true form intended for the finished work, said cover having a non-cutting semi-cylindrical inner face, means for maintaining the swinging edge of the cover closed, said cover being formed with a recess which extends in a radially outward direction from the inner periphery of the cover, and having a screw hole which extends from said recess through the outer periphery of the cover, a floating block slidable radially in said recess, its inner end being concaved and adapted to engage the curved surface of the work in the holder, and a screw which is adjustable in said screw hole in the cover and is capable of being set up to engage with said block and hold the block in position to maintain the work in operative relation to the cutter.

In testimony whereof I have hereunto set my hand.

THOMAS SMITH.